(12) United States Patent
Barbulescu et al.

(10) Patent No.: US 9,538,003 B2
(45) Date of Patent: *Jan. 3, 2017

(54) SYSTEM AND METHOD FOR INTERACTIVE ADVERTISEMENT AUGMENTATION VIA A CALLED VOICE CONNECTION

(71) Applicant: Alpine Audio Now, LLC, Reston, VA (US)

(72) Inventors: Marcel Barbulescu, Falls Church, VA (US); Elan Joel Blutinger, Washington, DC (US); Joseph Bous, Washington, DC (US); Thomas M. Isaacson, Huntingtown, MD (US); Jeffrey N. Pollack, Los Angeles, CA (US)

(73) Assignee: AudioNow IP Holdings, LLC, Wilmington, DE (US)

( * ) Notice: Subject to any disclaimer, the term of this patent is extended or adjusted under 35 U.S.C. 154(b) by 7 days.

This patent is subject to a terminal disclaimer.

(21) Appl. No.: 14/585,620

(22) Filed: Dec. 30, 2014

(65) Prior Publication Data

US 2015/0110257 A1   Apr. 23, 2015

Related U.S. Application Data

(63) Continuation of application No. 14/154,960, filed on Jan. 14, 2014, now Pat. No. 8,924,254, which is a continuation-in-part of application No. 12/884,929, filed on Sep. 17, 2010, now Pat. No. 8,630,899.

(60) Provisional application No. 61/243,760, filed on Sep. 18, 2009.

(51) Int. Cl.
*G06Q 30/00*     (2012.01)
*H04M 11/00*     (2006.01)
*H04M 3/493*     (2006.01)
*G06Q 30/02*     (2012.01)

(52) U.S. Cl.
CPC .......... *H04M 3/493* (2013.01); *G06Q 30/0251* (2013.01); *G06Q 30/0257* (2013.01); *G06Q 30/0267* (2013.01); *G06Q 30/0272* (2013.01); *H04M 11/00* (2013.01)

(58) Field of Classification Search
CPC ... H04M 11/00; H04M 3/493; G06Q 30/0257; G06Q 30/0251
See application file for complete search history.

(56) References Cited

U.S. PATENT DOCUMENTS 6,131,043 A    10/2000  Shimizu
6,181,785 B1    1/2001  Adams et al.
6,400,804 B1 *  6/2002  Bilder ................... H04M 3/428
                                                         379/114.13

(Continued)

*Primary Examiner* — Lisa Hashem

(57) ABSTRACT

Disclosed herein are systems, methods, and computer-readable storage devices for streaming data. The method includes presenting a data stream including an interactive communication and detecting feedback from the user in response to the interactive communication. If the feedback indicates a request to receive data associated with the interactive communication, the method includes buffering the data stream from a point in time associated with the feedback to yield a buffered data stream, connecting the user device to a commerce presence associated with the interactive communication temporarily and resuming playback of the buffered data stream to the user device following completion of the temporary communication between the user device and commerce presence.

19 Claims, 9 Drawing Sheets

(56) References Cited

U.S. PATENT DOCUMENTS

| | | |
|---|---|---|
| 7,050,568 B2 | 5/2006 | Brown et al. |
| 7,130,392 B2 | 10/2006 | Morton |
| 8,051,369 B2 | 11/2011 | Zirngibl et al. |
| 8,788,075 B2 | 7/2014 | Ellis |
| 2006/0147006 A1 | 7/2006 | Gonen et al. |
| 2006/0190336 A1 | 8/2006 | Pisaris-Henderson et al. |
| 2006/0259365 A1 | 11/2006 | Agarwal et al. |
| 2006/0277108 A1 | 12/2006 | Altberg et al. |
| 2007/0011240 A1 | 1/2007 | Altberg et al. |
| 2007/0022011 A1 | 1/2007 | Altberg et al. |
| 2007/0067219 A1 | 3/2007 | Altberg et al. |
| 2007/0083408 A1 | 4/2007 | Altberg et al. |
| 2007/0121844 A1 | 5/2007 | Altberg et al. |
| 2007/0121845 A1 | 5/2007 | Altberg et al. |
| 2007/0121846 A1 | 5/2007 | Altberg et al. |
| 2007/0121847 A1 | 5/2007 | Faber et al. |
| 2007/0121848 A1 | 5/2007 | Faber et al. |
| 2007/0124206 A1 | 5/2007 | Faber et al. |
| 2007/0124207 A1 | 5/2007 | Faber et al. |
| 2007/0127650 A1 | 6/2007 | Altberg et al. |
| 2007/0130014 A1 | 6/2007 | Altberg et al. |
| 2007/0140451 A1 | 6/2007 | Altberg et al. |
| 2007/0143182 A1 | 6/2007 | Faber et al. |
| 2007/0160184 A1 | 7/2007 | Altberg et al. |
| 2007/0162296 A1 | 7/2007 | Altberg et al. |
| 2007/0165805 A1 | 7/2007 | Altberg et al. |
| 2007/0189473 A1 | 8/2007 | Altberg et al. |
| 2008/0010129 A1* | 1/2008 | Maggio .................. G06Q 30/02 705/14.55 |
| 2008/0057919 A1 | 3/2008 | Choi-Grogan |
| 2008/0147505 A1* | 6/2008 | Davis .................. G06Q 30/02 705/14.64 |
| 2008/0214163 A1 | 9/2008 | Onyon et al. |
| 2009/0136011 A1 | 5/2009 | Goel |
| 2010/0014648 A1 | 1/2010 | Baglio et al. |
| 2011/0081953 A1 | 4/2011 | Higuchi |
| 2012/0209413 A1* | 8/2012 | Xu .................. H04N 21/233 700/94 |
| 2012/0233644 A1* | 9/2012 | Rao .................. H04M 1/7253 725/62 |
| 2013/0054825 A1* | 2/2013 | Mareachen ........ H04N 21/4325 709/231 |
| 2013/0179918 A1* | 7/2013 | Roberts .............. H04N 21/2393 725/32 |
| 2014/0359660 A1* | 12/2014 | Waibel ................ H04N 21/435 725/34 |
| 2015/0189369 A1* | 7/2015 | Marko ................ G11B 27/034 725/32 |
| 2015/0317680 A1* | 11/2015 | Richman ............ G06Q 30/0257 705/14.55 |
| 2015/0319479 A1* | 11/2015 | Mishra ............... G06Q 30/0257 725/32 |
| 2015/0326945 A1* | 11/2015 | Johnson ............... H04N 21/812 725/32 |
| 2015/0365712 A1* | 12/2015 | Waibel ................ H04N 21/435 725/34 |
| 2016/0218986 A1* | 7/2016 | Klemetti ................ H04L 47/30 |
| 2016/0227030 A1* | 8/2016 | Iltus ................ H04M 3/42221 370/252 |

* cited by examiner

SYSTEM AND METHOD FOR INTERACTIVE ADVERTISEMENT AUGMENTATION VIA A CALLED VOICE CONNECTION

PRIORITY

The present application is a continuation of U.S. patent application Ser. No. 14/154,960, filed Jan. 14, 2014, which is a continuation-in-part of U.S. patent application Ser. No. 12/884,929, filed Sep. 17, 2010, now U.S. Pat. No. 8,630,899, issued Jan. 14, 2014, which claims priority to U.S. Provisional Patent Application No. 61/243,760, filed 18 Sep. 2009, the contents of which are herein incorporated by reference in their entirety.

BACKGROUND

1. Technical Field

The present disclosure relates to streaming audio or data via a communication link and more specifically to provide the caller with a data connection to a merchant who provides interactive communications within the streaming data.

2. Introduction

Basic mechanisms are known for advertising to users when listening to radio stations. In some cases, radio stations that broadcast over the airwaves and over the Internet may present different advertising in different markets and via the different distribution networks. In other words, they may present one set of advertisements for webcasting listeners and another set of advertisements for over the air radio listeners in different markets. However, there is no possibility of interacting with the audio stream in these scenarios. If a user desires to follow up on an advertisement, or desires more information about a product, the user must call the store, search on the Internet for more information, or go to a brick and mortar store for more information.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and storage media for audio streaming. The system includes a processor and modules configured to control the processor to present an audio stream received from a website or a server to a user device via a telephone call, the audio stream having zero or more advertisements, and detect feedback from the user in response to the advertisement(s). The audio can also be played from a storage location local to the device. The system also includes modules configured to control the processor to buffer the audio stream from a point in time associated with the detected feedback, and connect to a commerce presence associated with the at least one of the advertisements and create a telephone session between the user device and the commerce presence.

In one embodiment which is the focus of this continuation-in-part application, a method includes presenting, via a first communication link, a data stream from a website, a server, or from a local memory such as a cache, to a user device, the data stream including an interactive communication. The data stream can be video, audio, a still image, a combination thereof, or other forms of media such as an image or an image having accompanying audio. The data stream can come from the website or server or may be derived from a recording of the media locally on the device, with the addition of data from a server that enables the interactive communication. In other words, a home video taken on the device could be locally stored, and enhanced by data from a server such that when the user plays the recorded video, the ability to have an interactive communication is enabled.

The method includes detecting feedback from the user via the user device in response to the interactive communication and, if the feedback indicates a request to receive data associated with the interactive communication, performing operations including buffering the data stream from a point in time associated with the feedback to yield a buffered data stream, connecting the user device to a commerce presence associated with the interactive communication via a second communication link to yield a temporary communication and resuming playback of the buffered data stream to the user device via the first communication link following completion of the temporary communication via the second communication link between the user device and commerce presence.

In another embodiment, the system also includes a module configured to control the processor to resume playback of the buffered audio stream following completion of the session. The commerce presence may be one of a call center, a merchant, and an interactive voice response system. The system also includes a module configured to control the processor to replace on-hold music of the commerce presence with the buffered audio stream, supersede advertisements in the audio stream with advertisements selected from an advertisement database or insert advertisements where none existed in the audio stream. The advertisements are selected from an advertisement database according to a user profile or in some other fashion.

The method includes a system or device presenting an audio stream received from a website, a server or from a local storage device, to a user via a telephone call or other data stream, and detecting feedback from the user about advertisements. If the detected feedback indicates a request to receive more information about the advertisements, the method includes buffering the audio stream from a point in time associated with the detected feedback, connecting to a commerce presence associated with the at least one of the advertisements and creating a call session between the user device and the commerce presence, and resuming playback of the buffered audio stream following completion of the session. The connecting to the commerce presence preferably includes establishing a phone call to the commerce presence and connecting the telephone call to that call such that the user becomes connected to the commerce presence.

In one embodiment, the method includes replacing on-hold music of the commerce presence with the buffered audio stream, and superseding or inserting advertisements in the audio stream with advertisements selected from an advertisement database. Superseding includes one of replacing, masking, and augmenting the advertisement. The storage medium stores a set of instructions executable on a data processing device and usable to perform the method.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
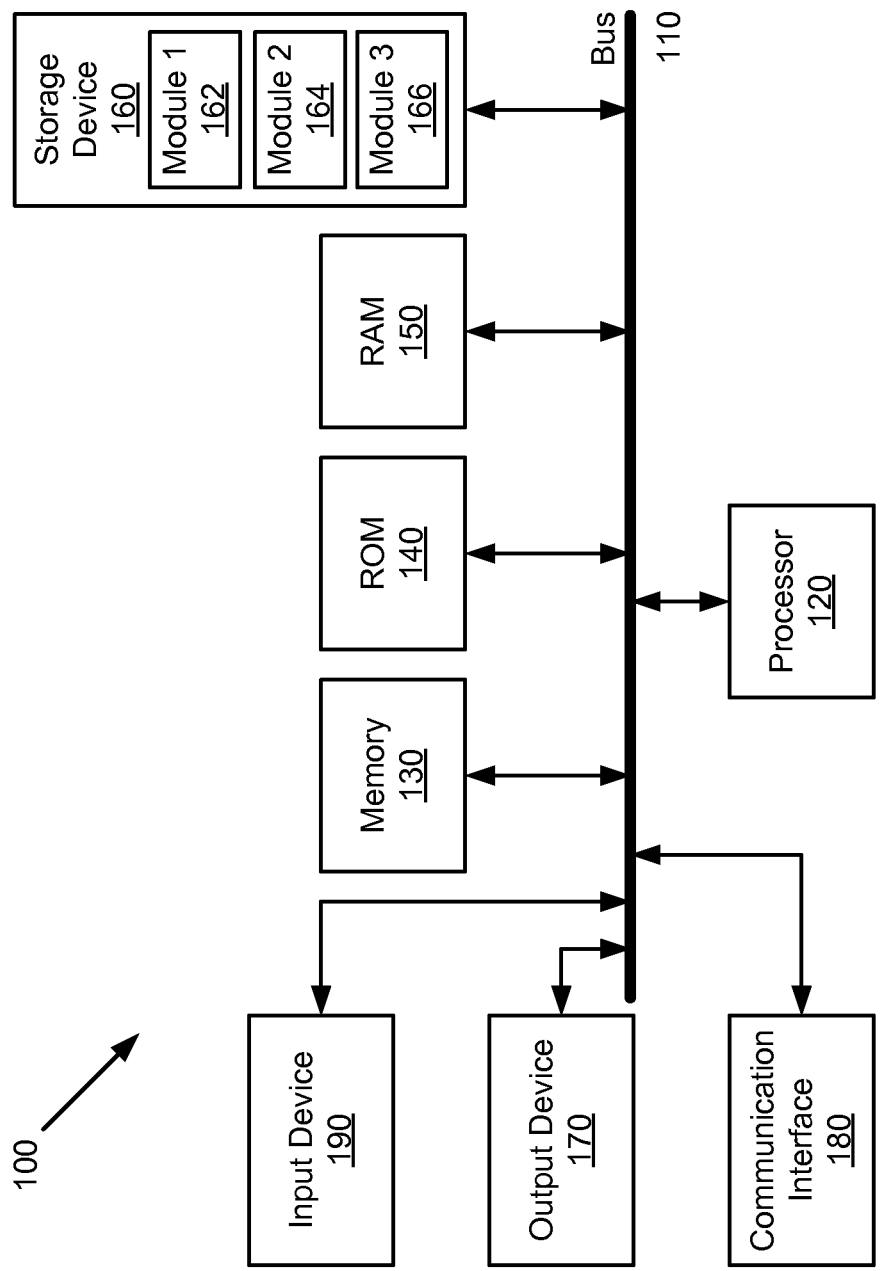
FIG. 1 is a schematic block diagram illustrating an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. These and other modules can be configured to control the processor 120 to perform various actions. Other system memory 130 may be available for use as well. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a tangible and/or intangible computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. The input device 190 may be used by the presenter to indicate the beginning of a speech search query. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Generally speaking, such logical operations can be implemented as modules configured to control the processor 120 to perform particular functions according to the programming of the module. For example, FIG. 1 illustrates three modules module 1 162, module 2 164 and module 3 166 which are modules configured to control the processor 120. These modules may be stored on the storage device 160 and loaded into RAM 150 or memory 130 at runtime or may be stored as would be known in the art in other computer-readable memory locations.

Figure 2:
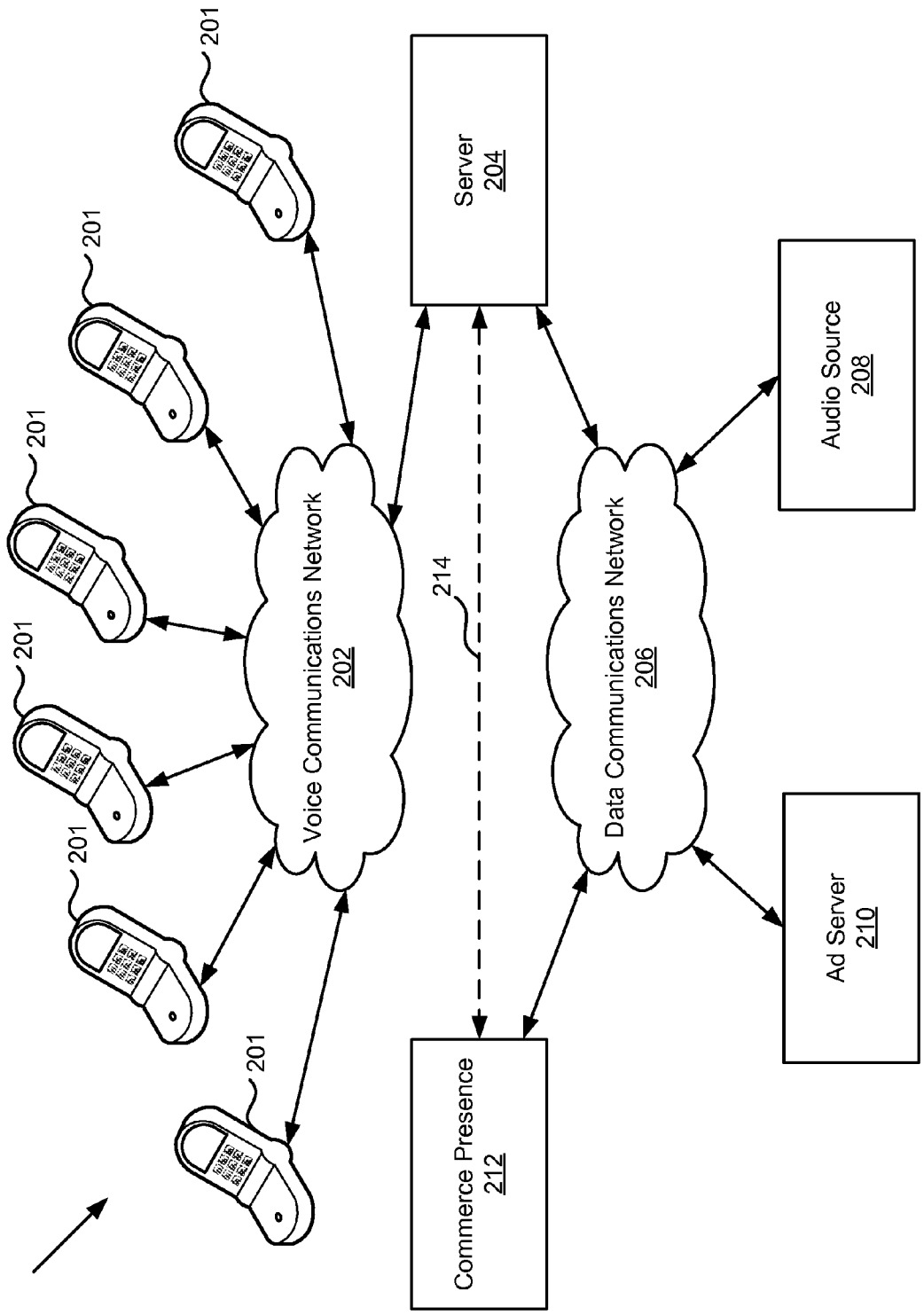
FIG. 2 is a schematic block diagram illustrating one embodiment of a system for streaming audio via a called voice connection.

FIG. 2 is a schematic block diagram illustrating one embodiment of a system 200 for streaming audio via a called voice connection. The system 200, in one embodiment, includes voice communication devices 201 capable of connecting via a voice communications network 202 to a server 204. The voice communication devices (hereinafter "telephones") 201 enable a user to call via the telephone into the server 204 and listen to streaming audio. The server 204 receives the streaming audio via a data communications network 206 from an audio source 208. An example of the audio source is a website or server that streams audio over the Internet 206 or some other communications network.

Examples of suitable telephones 201 include, but are not limited to, cellular phones, cordless phones, Voice Over IP phones, satellite phones, standard landline telephones, voice over IP computers and POTS phones. In other words, the telephones 201 are representative of any device capable of making a phone call. The voice communications network 202, subsequently, can include cellular telephone networks, the Internet, satellite networks, and POTS. Put differently, the voice communications network 202 is any network capable of transmitting the telephone call from the telephone 201 to the server 204.

The server 204 communicates over both the voice communications network 202 and the data communications network 206. The data communications network 206, in one embodiment, is the Internet, or alternatively, any network capable of communicating data. For example, cellular data networks, local area networks, WIFI networks, private area networks, and other packet switching networks.

The system 200, in one embodiment, also includes an audio source 208, an ad server 210, and a third party commerce presence 212. The audio source 208, for example, is a website hosting an audio stream such as the website for a radio station or other source of audio such as a server, blog or a personal website. Alternatively, the audio source 208 is any Internet accessible audio stream. In another embodiment, the server 204 directly contacts the audio source 208, bypassing the data communications network 206, via a direct modem connection, for example. Furthermore, the audio source 208 may be a database coupled with the server 204 via a local bus, local network, storage area network, etc. The audio stream hosted by the audio source 208 may represent a live event such as a live radio talk show, podcasts, or, the audio stream may be a recording of an event that has happened in the past. Much of the disclosure will focus on steps that are performed by server 204.

The ad server 210 is a repository of advertisements available to the server 204 over the data communications network 206. The ad server 210 hosts the advertisements that the server 204 uses in ad augmentation, insertion, replacement, etc., as will be described in greater detail below. The commerce presence 212 is representative of a commercial store that offers products or services to customers. Examples of the commerce presence 212 include, but are not limited to, a call center, a server, a website, a merchant, and an interactive voice response system. As depicted, the server 204 may contact the commerce presence 212 via the data communications network 206, or alternatively, directly 214 via a phone call to the commerce presence 212.

Figure 3:
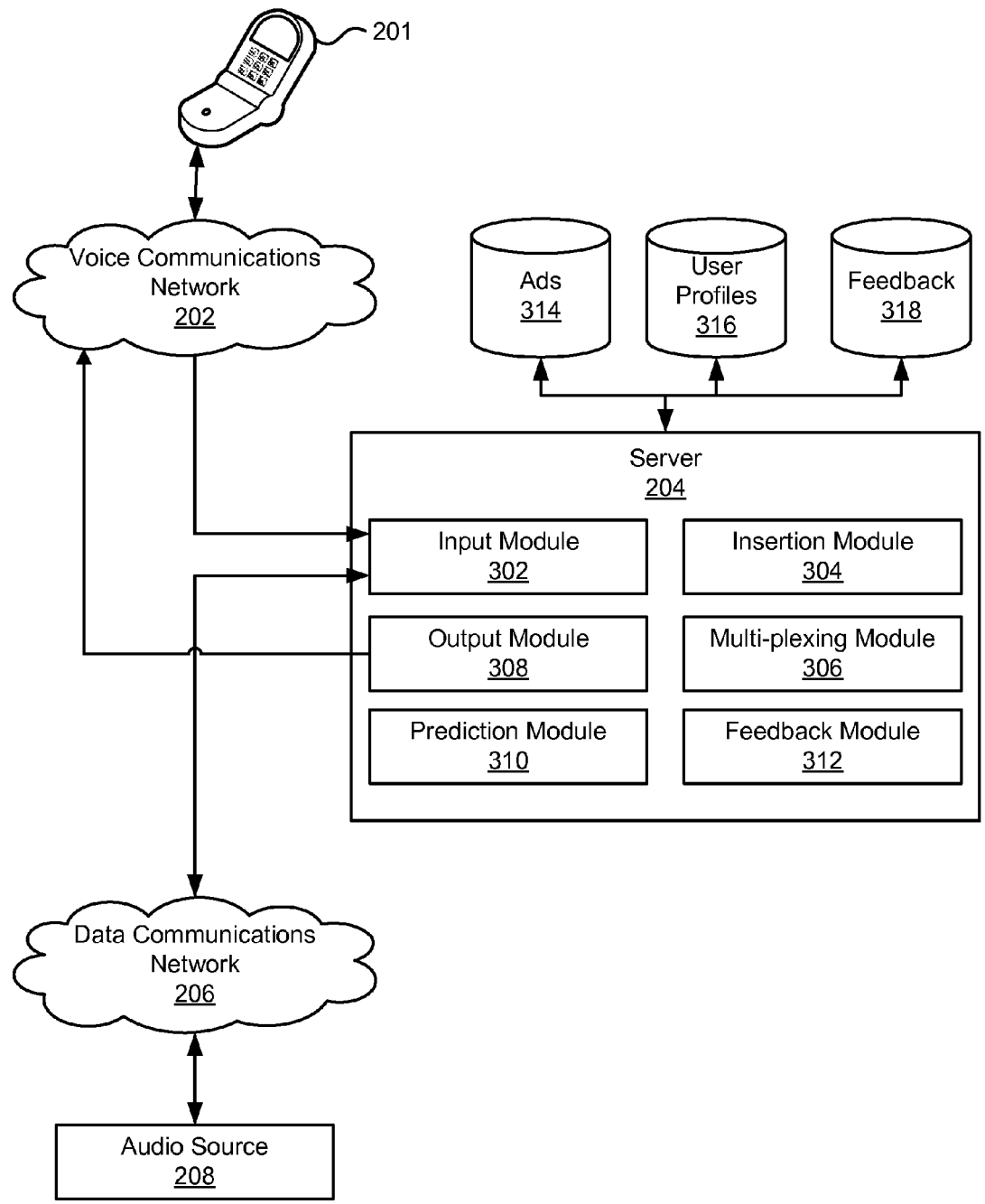
FIG. 3 is a schematic block diagram illustrating one embodiment of a server.

FIG. 3 is a schematic block diagram illustrating one embodiment of the server 204 described above with reference to FIG. 2. The server 204 includes an input module 302, an insertion module 304, a multi-plexing module 306, an output module 308, a prediction module 310, a feedback module 312, and databases 314, 316, 318. The input module 302 receives voice calls from the telephones 201 via the voice communications network 202, and also receives streaming audio from the audio source 208 via the data communications network 206. The input module may include, for example, a bank of modems for receiving the telephone calls and network adapters for receiving the streaming audio.

The insertion module 304 analyzes the streaming audio and detects advertisement identifiers. Advertisement identifiers are, in one embodiment, codes that precede an advertisement contained within the streaming audio. One example of an advertisement identifier is an Industry Standard Commercial Identifier (ISCI) that typically is a set of 8 characters for describing the advertisement. Alternatively, the insertion module 304 may identify an advertisement by recognizing a change of speakers, background noise, content, etc. The insertion identifier may also identify not where an ad exists but where an advertisement should be inserted. Buffering can easily enable different lengths of advertisements. For example, the server 204 may dynamically determine which advertisement to insert (where none existed originally in the stream) and use buffering to continue the audio program after the advertising. The insertion module 304 inserts new advertisements into the streaming audio recorded from the audio source 208. In one embodiment, this includes superseding or masking the original advertisement with a new advertisement. Alternatively, this may include augmenting an advertisement with a longer advertisement. For example, if the streaming audio has a 15 second advertisement for a product, the insertion module 304 may mask the original advertisement with a 30 second advertisement for the same or different product or service. Furthermore, the insertion module 304 may insert entirely new advertisements without replacing the original advertisements or insert advertisements where no advertisement is in the original audio stream. In this embodiment, the streaming audio is buffered by the server 204 while the new advertisement plays to the telephones 201, and upon completion of the new advertisement the streaming audio playback is continued in a manner that appears seamless to the listener.

If the streaming audio received from audio source 208 includes no advertisements, then the insertion module may insert advertisements at various locations in the audio stream at point determined by an analysis of the audio stream. For example, a website or server can provide streaming audio and provide commentary or music and then leave a blank silent portion for 3 seconds. The server 204 in its analysis of the audio can identify that silence as an inserting identifier and insert an advertisement at that point, buffer the remaining streaming audio, and continue playing the streaming audio through the voice communication network to device 201 following the advertisement. In this manner, using the server system 204, individual audio sources can easily obtain the ability to insert advertisements into their content by simply providing small periods of silence or some other insertion identifier such as certain words spoken that are interpreted by server 204 through voice analysis or a mouse click through an interface at the audio source.

In addition, indicators may also be inserted in such audio streams by the audio source 208 to indicate where advertisements should be inserted. Again, in this manner, audio sources 208 can easily utilize the service provided by server 204 to have advertisements inserted into their audio streams at the point of conversion between web streaming audio and the telephone call. Various payment arrangements may be made in order to provide profits to audio sources if advertisements are inserted. These payments can be automatically determined based on the volume of calls and how often advertisements are inserted into such streaming audio.

Indicators may also be provided by the audio source out of band or external to the audio stream. The signal can provide information about the ads (or lack of ad but desire to insert an ad). Those of skill in that art understand how such out of band signaling occurs.

In another aspect, the advertisement can be inserted at the website 208 or server or via network 206. If this approach is used then all webcast listeners, not just those listening via a telephone call, will hear the advertisements. In this embodiment, server 204 or some other control point in the system identifies an ad insertion indicator and inserts an ad from the ad server into the web streaming audio. A web caster sitting at home providing an audio stream through their personal computer 208 could click an ad insert button and take a break, the system 204 would detect this indicator and insert ads at that point. The user could then take a break and upon returning, click another button indicating they are ready to begin again with audio. They could immediately begin and server 204 could manage buffering or server 204 could present into motion to the user of server 208 when the current advertisement will end. At which point the user can start taking live again. This enables an easy mechanism for individuals to have reserve generating advertisements presented on their web casts. Audio web-blogging is enabled.

The multi-plexing module 306 receives the stream with the new advertisements from the insertion module 304 and multi-plexes the streaming audio depending on the number of listeners that have called in to the server 204 and are listening to that particular stream of audio from audio source 208. In other words, the multi-plexing module 306 receives the single streaming audio stream and replicates the stream to as many listeners as needed. Thus, a first group of callers may be listening to streaming audio from ABC radio station, while another group of callers is listening to XYZ station. Further, the multi-plexing module 306 can prepare streams that are unique for each listener. For example, as will be described below, the insertion module 304 can customize the advertisements for each user based on a user profile 316 and/or other data like location data, purchase history, etc., and the multi-plexing module 306 prepares the streams according to the selected advertisements. The output module 308 communicates the streams to the devices 201. As described above with reference to the input module 302, the output module 308 may include a bank of modems for receiving voice calls from the telephones. In an alternative embodiment, the output module 308 may be incorporated into the input module 302.

The prediction module 310 analyzes the voice call and determines the types of advertisements to insert in the streaming audio. The prediction module 310 accomplishes this by identifying the user and selecting an appropriate advertisement from the Ads database 314 or ad server 210 of FIG. 2. Identifying the user, for example, may include using caller identification to associate the caller with a certain geographic area based on area code. In this example, the prediction module 310 can then select advertisements from the ads database 314 or ad server 210 that are specific to the geographic area of the caller. The prediction module 310 can identify the caller based on a user profile stored in the user profiles database 316. In one embodiment, each caller establishes a user profile having biographical information including, but not limited to, age, gender, etc. As such, the prediction module 310 may select advertisements based on the biographical information.

The feedback module 312 presents feedback options to the caller or listener via device 201, and stores the input in the feedback database 318. The feedback options, in one example, include "press 1 for more information on product X." The feedback also includes identifying how many times a particular advertisement is listened to over the voice communications network. The ability to particularly identify how many people actually listened to an advertisement is a beneficial metric to the companies that place advertisements over the radio, for example, and is not possible in traditional radio and television advertisements. In other words, the server 204 enables an advertiser to know exactly how many people heard the advertisement and how many people actually responded to the advertisement. This is comparable, in Internet advertising, to what is known as "click-through" rates, but was previously not accurately measurable. Such data can be gathered and stored for analysis and business applications.

Figure 4:
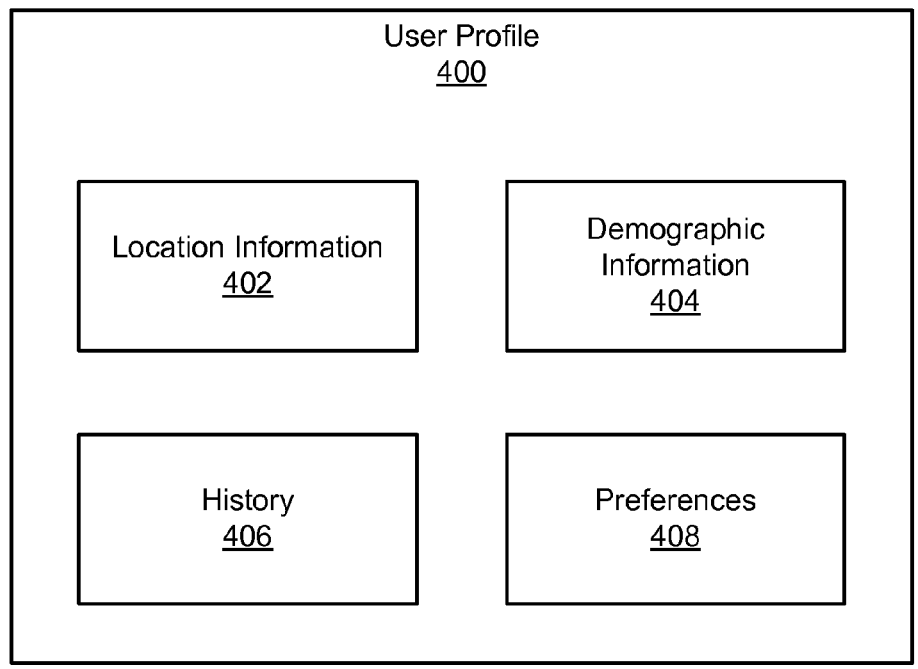
FIG. 4 is a schematic block diagram illustrating one embodiment of a user profile.

FIG. 4 is a schematic block diagram illustrating one embodiment of a user profile 400. User profiles 400 are stored in the user profile database as described above with reference to FIG. 3. The user profile 400, in one embodiment, includes location information 402, demographic information 404, a history 406, and preferences 408. The location information 402 includes the location of the caller, or general geographic region in which the caller resides. The demographic information 404 includes the above described biographical information, including for example, but not limited to, age, gender, race, religion, sexual preference, education, income class, etc.

The history 406 includes information pertaining to the listening history of the user, including, the types of programs heard by the user, and the types of advertisements to which the listener has responded. Preferences 408, in one embodiment, include the types of programs the user does or does not want to listen to, the types of advertisements the user does or does not want to hear, etc.

Figure 5:
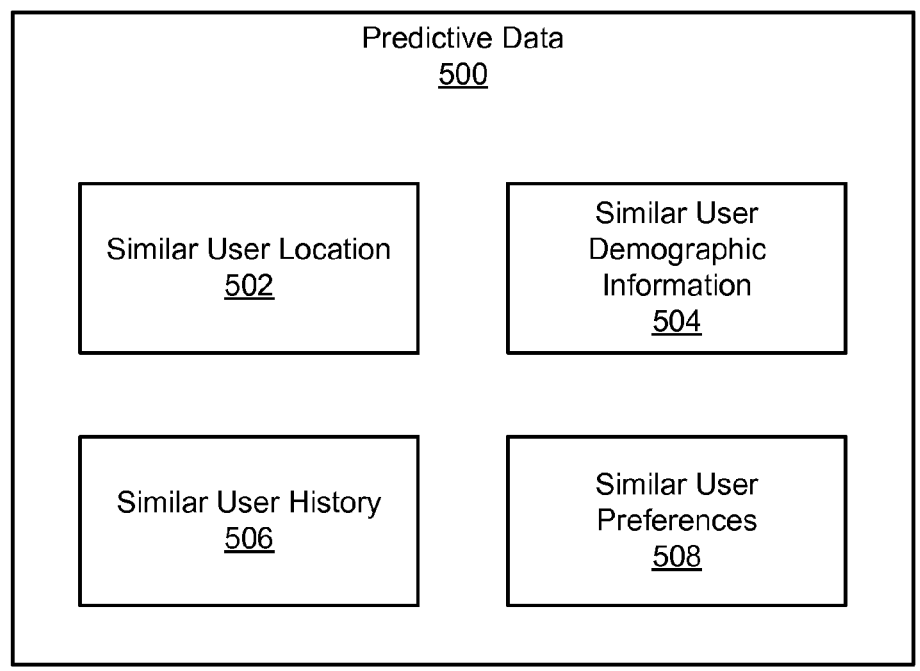
FIG. 5 is a schematic block diagram illustrating one embodiment of predictive data.

FIG. 5 is a schematic block diagram illustrating one embodiment of predictive data 500. The prediction module 310 may utilize predictive data 500 to select radio programs and advertisements that will appeal to the listener. For example, the prediction module 310 may select a sports-related talk show and sports-related advertisements if the user has a history of listening to ESPN®. The prediction module 310 can also utilize data from other listeners to select programs. For example, the predictive data 500 may include similar user location 502 data, similar user demographic information 504, similar user history 506, and similar user preferences 508.

In another aspect, the system can cluster user profiles in order to predict via the prediction module 310 what advertisements to present to users. For example, the system can cluster user profiles for all users who have selected a particular radio station such as ESPN. This clustering aspect enables the system 204 to identify and gather more information about the types of users that should receive certain advertisements. Thus, another aspect of how prediction and advertisement selection involves using information about users and the listing of radio stations that users select to include in their personalized menus when the call into the system. In other words, one aspect of the capabilities server 204 is to receive selections from users for a personalized menu system. Thus, a first user can identify radio stations A, B, C and D which will then be presented as options for that user to select when they call into the system. A second user may select radio stations D, E, F and G for their menu. The system may cluster these users inasmuch as they both share radio station D in their menu systems. Thus, other information may be aggregated such that advertisements sent to the first user and the second user may be more focused on their likely interests.

In another aspect, this system may be set up such that each radio station has a dedicated phone number. In this respect, users would not select via a menu system but would call directly a particular number into server 204 which then connects them to the particular radio station stream as selected by the phone number that was called. In this respect, all advertisements presented to callers of that phone number may be based on the individual user profile or a cluster of user profiles. In this regard, the cluster information would not necessarily include common radio stations on a particular menu but rather other types of interests or knowledge about the users which can be gained from individual user profiles.

Figure 6:
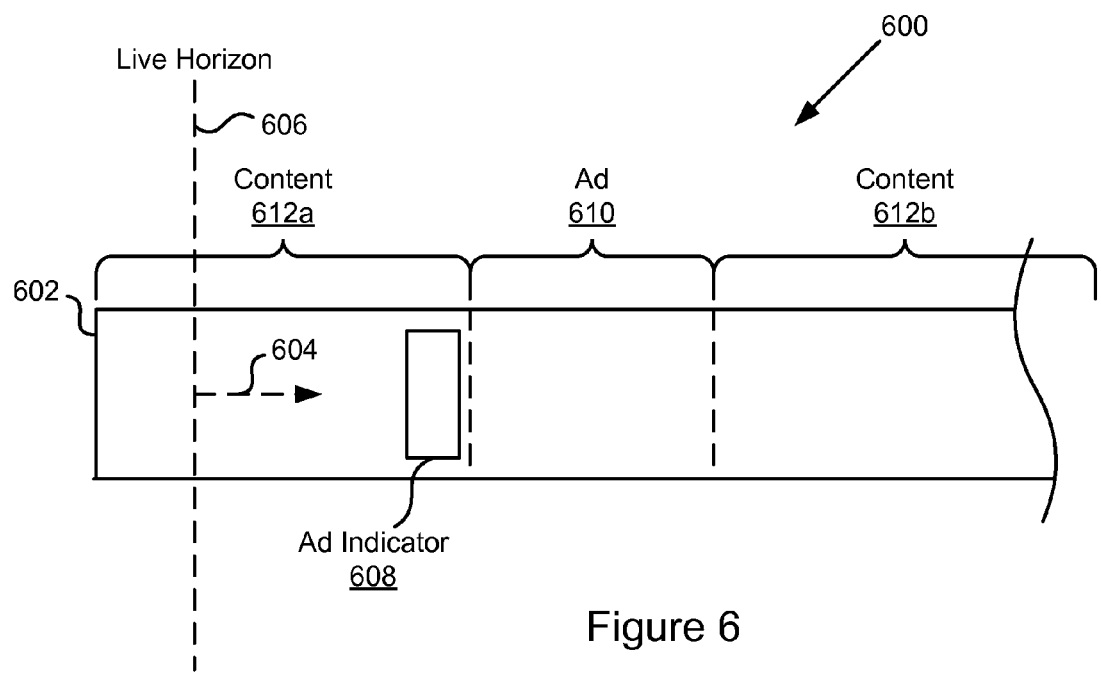
FIG. 6 is a schematic block diagram illustrating an audio stream.

FIG. 6 is a graphical representation of an audio stream 600. The stream 600 is depicted here with a starting point 602 and continuing in the direction of arrow 604. In one example, the stream 600 could be representative of a radio program starting at 5 AM and continuing until 9 AM, with the arrow 604 representing the direction the live horizon 606 travels from 5 AM to 9 AM. In other words, the live horizon 606 is the current time and the arrow 604 indicates that the live horizon 606 is traveling towards the end of the stream 600.

The stream 600 includes ad indicators 608 or identifiers as described above, advertisements 610, and the content 612A and 612B. Although depicted here in a certain order, the content 612A and 612B typically represent a significant portion of the stream 600 with ad indicators 608 and ads 610 distributed in blocks of time across the stream 600.

As the live horizon 606 approaches an ad indicator 608, the insertion module 304 detects the ad indicator and determines whether to supersede the advertisement (or insert one if none exists). As used herein, the term supersede refers to performing at least one of replacing an advertisement, masking an advertisement, augmenting the advertisement with an advertisement of different duration, inserting an ad where none exists and removing an advertisement. Each of the above described situations with reference to "superseding" may be implemented during playback of the stream 600. Note that this involves the ad from the streaming website or server to a telephone call to device 201.

In addition to superseding, advertisements may simply be inserted into the streaming audio that is received from the audio source 208 such that the audio stream output to the telephone call via voice communication network device 202 to device 201 includes an inserted advertisement that does not replace or augment any existing advertisement. Therefore, in this manner, the original audio source may not even need to worry about providing or managing any advertisements but may simply purely provide the audio.

The schematic flowchart diagrams and/or schematic block diagrams in the FIG.s illustrate the architecture, functionality, and operation of possible implementations of apparatuses, systems, methods and computer program products according to various embodiments disclosed herein. In this regard, each block in the schematic flowchart diagrams and/or schematic block diagrams may represent a module, segment, or portion of code, which includes one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

Figure 7:
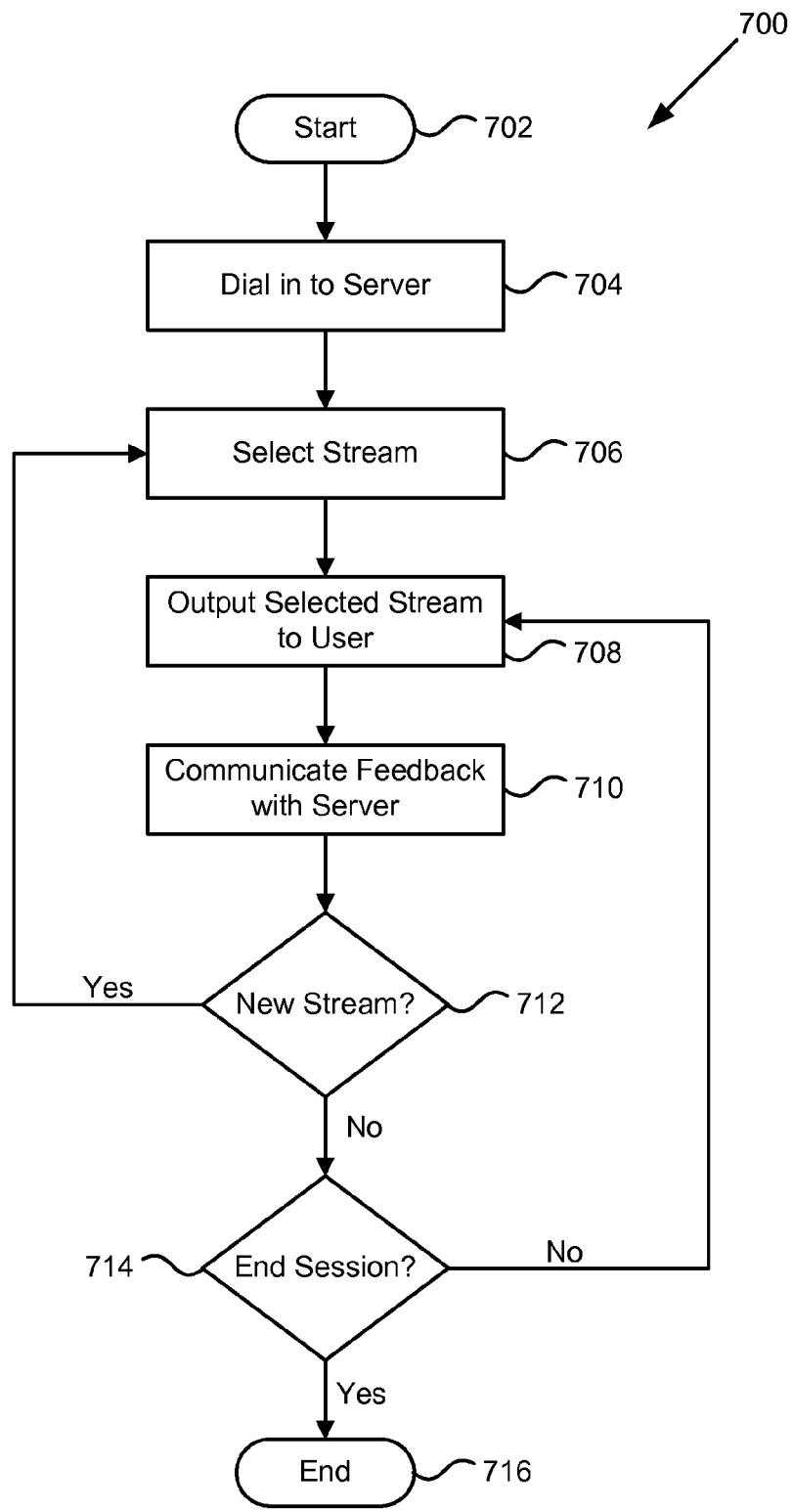
FIG. 7 is a schematic flowchart diagram illustrating one method of streaming content to a caller.
Figure 9:
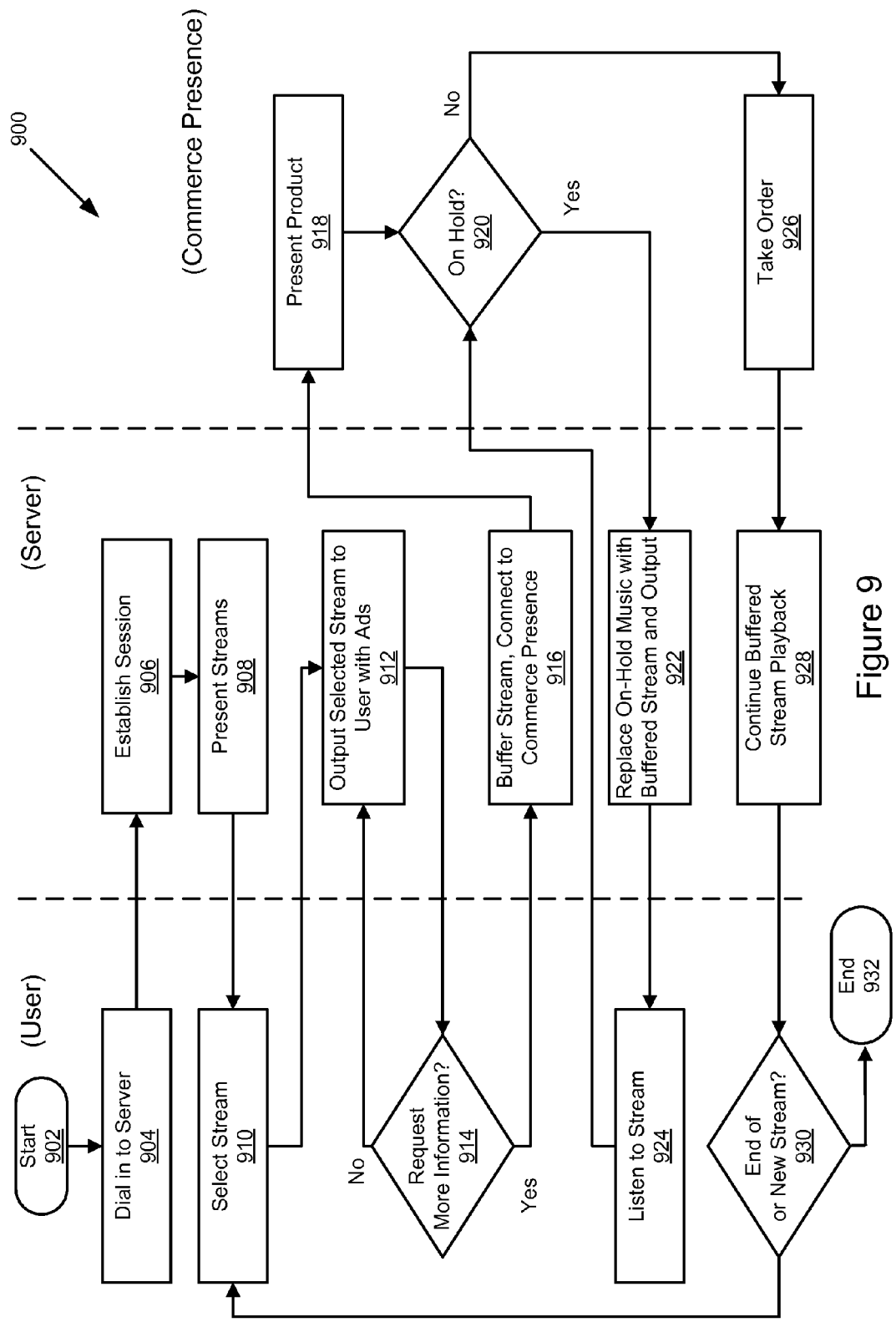
FIG. 9 is a schematic flow chart diagram illustrating one embodiment of a method for connecting a user with a commerce presence.

FIG. 7 is a schematic flowchart diagram illustrating one method of streaming content to a device 201 associated with a caller. The method preferably is performed by server 204. The method 700, in one embodiment, starts 702 and the caller dials 704 in to the server 204 over the voice communications network 202 of FIG. 2. The caller selects 706 a stream to hear. Alternatively, the prediction module 310 selects a stream based on the user profile and/or the prediction data. The output module 308 outputs 708 the stream to the user or caller device 201 and begins to collect and communicate 710 feedback with the server. As described above, the feedback includes identifying how many times a particular advertisement is streamed to the caller, and if the caller elected to hear more information about the advertisement or to take some other action. More details about this process are shown in FIG. 9.

The input module 302, in one embodiment, detects 712 a new stream selection from the caller and begins playback of the new stream. If the stream ends 714 and the user has not selected a new stream, the method ends 716. Alternatively, the output module 308 outputs 708 a new stream to the user based on the prediction module 310.

One other action which can be taken includes receiving communication from the user during an advertisement and providing information to the user via an alternate communication mechanism. Because the context of the present disclosure is a user device 201 communicating with server 204 via a voice communication network via a telephone call, and if the system has a user profile 316 which can include information such as an email address or contact information for an SMS message, the user hears an advertisement during the telephone call the user may be presented the option of "pressing 1" to have information about the advertisement emailed to them. In this manner, the user can easily via the telephone call, identify under what circumstances they may receive further information. In this case, a link to a website or a deep link into a merchant website with information about a particular product that is the subject matter of the advertisement may be emailed to the user or communicated in some other fashion to the user in order to enable them to easily order or view more information about the product or service. In one example, if a particular product such as a mountain bike is the subject of an advertisement, and the user presses a number to purchase the mountain bike, then the server 204 may email a deep link to the user such that when the link is selected from the email, the user is immediately presented with a merchant page such as an Amazon.com "one click" purchasing page that lists the mountain bike and also uses stored information about the user to enable them to purchase in a one-click mechanism. Server 204 can communicate user profile information such that the prerecorded information associated with the Amazon.com account can be negotiated and approved at the backend. In this regard, the user can take the following steps for hearing an advertisement, desiring to learn more information and then committing to purchase the product.

First, the user hears an advertisement via the telephone calling device 201. Next, the user provides input via pressing a key, providing audio input, graffiti input, or any other kind of input to indicate an interest in purchasing the item that is the subject matter of the advertisement. The server 204 then uses information about the advertised product, the appropriate merchant, and the user, creates a website or server link for the user. One example of how this may be done is that the server 204 can essentially open an Amazon.com window, negotiate and search for the product, identify that the user has an account that enables that user to purchase products via one click purchasing, and emails the generated link to the user's email address. The user, after the telephone call (or during the telephone call) receives the emailed (or other communication method) link, pulls up the website, views the product and any information about the product, and then can simply purchase the item via a one click option. The caller can also be presented with an option to receive a call from the commerce presence at which point the system 204, after the call in which the user hears the audio stream, contacts the merchant who will then call the user to discuss the advertised item. The system can also call the merchant, provide an audio description of the user and the item of interest ("Mark wants to buy a bike, connecting you now"), call the user, and then connect the call.

In this fashion, the system 204 can manage connecting a call between the caller and the merchant in such a way that both may receive a call rather than needing to make a call. This eliminates the need to pass along a phone number for example of the user that the merchant would need to call or a phone number for the merchant that the user would need to call. The system 204 can also manage connecting the call in such a way to insure that both parties are available to talk. In other words, the party assumes that the user selects a desire to talk with an agent later or after listening to the audio stream. Then, after the user has finished listening to the streaming audio, the system 204 may call back the user and with a simple interaction, ask the user if they have a desire to talk to the merchant. The user can then indicate via pressing 1 or some other indication that they are ready to talk. At that point, the system can call the merchant, provide a brief description via audio of what the call is about ("We would like to connect you to Mark, who is interested in buying a bike"), optionally receive an indication from the merchant that they are ready to talk with the user ("Press 1 if you are ready to be connected with Mark in order to sell a bike"), and if so, connect the call. Again, in this manner, neither the merchant nor the user needs to know any phone number to make a telephone call but can simply be connected.

Server 204 can also manage store records to insure that a connection is made between the user and the merchant. For example, if the user is not interested at that time in talking with the merchant, then the system 204 can store the information that an attempt was made and that a later attempt again will be made to try and connect the user with the merchant. Then, at a later time, the system may call the user and again ask if they are prepared to talk to the merchant. Other options may be presented to the user such as, if you are not ready now, can we call back in Press 1 for a half hour, Press 2 for an hour, and so forth. In this manner, the user can select the time at which the system will call back and connect them with the merchant. In this scenario, the system may not then ask at the time if the user is prepared to talk to the merchant since they already indicated a time at which they will be ready. In this case, the system can call the merchant first, and notify the merchant that they are going to be connected with Mark who is interested in buying a bike, and once the merchant is safely on the line, the system can call the user and optionally present audio to the user indicating that the user is being connected with a merchant that is now on the line. At which point, the user and the merchant can be connected and discuss the item to be purchased.

Accordingly, one embodiment of the present disclosure involves the mechanisms by which the system 204 can connect buyers and sellers in an efficient and easy manner.

In one aspect, the particular merchant that is selling the mountain bike may sell through a distributor like Amazon.com or some other website or their own proprietary website. In this regard, other steps may need to be taken if a one click purchase is not available. However, the basic idea is to enable the server to generate an easy link for the product and perform the necessary negotiations between the user profile associated with the server 204 and the merchant in order to enable the business value chain experience of the user to be as short and as simple as possible. Server 204 may transmit user information to a website like Amazon.com to create the necessary user account to enable one-click purchasing. Such a negotiation of information could occur between Amazon.com and server 204.

Figure 8:
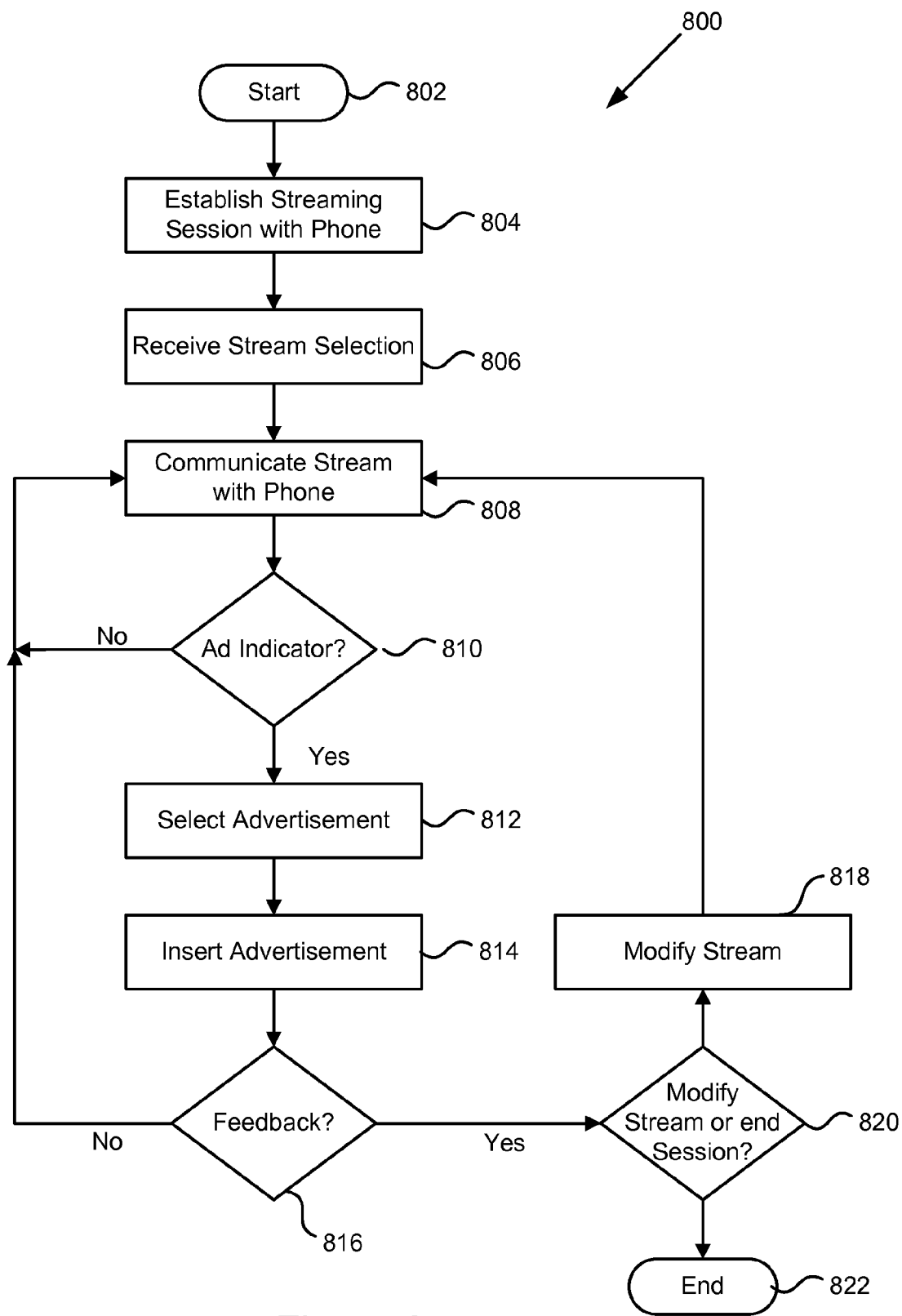
FIG. 8 is schematic flow chart diagram illustrating one embodiment of a method for superseding advertisements.

FIG. 8 is schematic flow chart diagram illustrating one embodiment of a method 800 for superseding advertisements. The method 800 can be practiced by a device or server 204 which starts 802 the process and establishes 804 a streaming call session with a telephone 201 as described above with reference to FIGS. 2 and 3. The input module receives 806 a stream selection from the user and the output module begins to communicate 808 the audio stream over the voice communications network 202 to the device 201.

If the insertion module detects 810 an advertisement indicator or identifier 608, the insertion module selects 812 an advertisement from the ads database 314 and inserts 814 the advertisement. As previously described, inserting an advertisement can also refer to replacing, removing, augmenting, masking, inserting, or superseding an advertisement. As noted above, in one aspect, the ad indicator 810 may not indicate the existence of an ad in the received audio stream but may indicate a desire to have an insertion module insert an advertisement at that particular location. Again, the ad indicator may be an inserted direct indicator or may be a passive indicator such as a period of silence in the audio stream of 2 seconds, for example.

The feedback module 312 monitors 816 for feedback from the user. If there is no feedback, the output module 308 continues communicating 808 the audio stream to the device 201. Alternatively, if the user provided feedback, the feedback may be in the form of instructions to modify 820 the stream by hearing more information about the advertisement, changing the stream to a new program, receiving an email or other communication about the content of the advertiser or ending the session. The system 204 can notify the merchant to call the user as well. If the user desires to modify 820 the stream, the feedback module 312 detects the feedback, notifies the output module 308 of the request, and the output module modifies 818 the stream and continues communicating 808 the stream to the device 201. Alternatively, the method 800 ends 822.

As an example of the user providing more information about the advertisement, the modification of the stream at step 820 and 818 may involve the listener's desire to hear more information about a particular product such as the mountain bike discussed above. In this case, the standard advertisement is provided which may take a period of time of 15 or 30 seconds. If the user provides feedback that they would like to modify the stream by hearing more information about the advertisement, in one aspect, the system may have a more lengthy audio presentation about the particular product. In this case, the user may simply be requesting more details about the mountain bike that they can simply listen to on their device 201. The system buffers or continues to buffer the programming audio stream and then inserts a more lengthy additional audio advertisement that presents more detailed information about the particular product. At this point, the user may again request feedback at step 816 for additional even more detailed information about the product. This process as one can see, can be an iterative process in which additional advertisements 814 may be selected 812 that provide even more information about the particular product. The advertisement can enable the user to press one for a particular type of information about the product, or press two for other types of information about the product. In this respect, stemming from a single 15 second advertisement may be numerous secondary audio presentations which the user can select through the feedback 816 mechanism. For example, one selection may tell the use to press "1" for more information about this product or press "2" for driving directions to the nearest merchant that sells this product. Another option may be to "press 3" to hear information about consumer reports and the best and most critical feedback about this product. Therefore, as an example, if 3 is pressed, the system can stream to the user the top user feedback available for the product as well as the user feedback that is most critical. The user can essentially gain much information about the product through simple interactions via the telephone call.

FIG. 9 is a schematic flow chart diagram illustrating one embodiment of a method 900 for connecting a user device 201 with a commerce presence 212 of FIG. 2 via a telephone call. The method 900 starts 902 and a user dials 904 in to the server 204. In other words, the communication device 201 initiates a phone call via the voice communications network 202 to the server 204. The server 204 establishes 906 a session with the communication device 201 and subsequently presents 908 audio streams that are available to the user. For example, the user can be presented with streams from different radio stations including sports talk, political talk, etc., or different genres of music. The user selects 910 from the available audio streams and the output module 308 of FIG. 3 outputs 912 the selected stream to the user. In one embodiment, the output module 308 outputs 912 the stream without modifying the audio stream. Alternatively, the output module 308 outputs 912 the stream with modified advertisements as described above. This includes, but is not limited to, replacing, masking, augmenting, inserting, and removing advertisements.

The user, upon hearing an advertisement, may request 914 more information about the product or service associated with the advertisement. For example, the advertisement may state something to the effect of "Press 2 to hear more about Product X." The server 204 will detect if the user "presses 2" and will begin to buffer 916 the audio stream while connecting the user device 201 to the commerce presence 212 associated with Product X.

The commerce presence 212 can be simply a merchant with a telephone, or can be an IVR system or a call center. In this regard, server 204 will dial the commerce presence 212 establish an open telephone call, and conference in or connect the user device 201 with a commerce presence via the telephone call. The end user at device 201 simply, from their point of view, is now talking to the commerce presence 212 without doing anything additional than providing the necessary indication that they would like to be connected with the commerce presence.

The server 204 buffers the audio stream so that following the session with the commerce presence 212 the user may return to listening to the audio stream without having missed any portions of the audio stream. In other words, the server 204 essentially "pauses" the audio stream while the user is connected to the commerce presence 212. Alternatively, the user decides 914 to not request more information and the server continues to output 912 the selected stream.

As described above, the commerce presence 212 is a call center, a server, website, or interactive voice response (IVR) system for presenting or selling a product or service. The server 204 connects 916 the user to the commerce presence 212 by, in one example, calling the commerce presence call center or IVR system and essentially hosting a three-way call between the user and the commerce presence. Alternatively, the server may include modules for interpreting a website, processing the text of the website, performing text-to-speech of the text of the website, presenting the product or service of the website to the user, and placing an order on the website for the user. Any reference to a website is also broad enough to encompass a server that may provide data to an application on a smartphone or any device that may not technically be a browser such that it access a "website."

The commerce presence or site presents 918 the product to the user, and, if while the user device 201 is connected to the commerce presence, the server 204 detects that the user has been placed on hold 920, the server 204 can replace the "on-hold music" with the buffered stream and output 922 the stream to the user. In other words, the user, while on hold, is able to listen 924 to the audio stream instead of the "on-hold music" of the commerce presence.

The commerce presence takes 926 and finalizes an order for the product or service associated with the advertisement or other product, the server 204 disconnects from the commerce presence and continues 928 playback of the buffered stream from server 208 so that the user has not missed any portion of the stream. At any point in this described method, the user may reach the end of a stream or decide 930 to listen to a different stream, and the server will again present available streams to the user. If the user decides to stop listening, the method 900 ends 932.

With the capability shown in FIG. 9, the server 204 can provide additional information which can aid in an enjoyable and productive telephone call between the user of device 204 and the commerce presence. Therefore, in one embodiment of the present disclosure, server 204 will utilize information available to it and provide that information to the commerce presence 212. For example, the server 204 has information about the caller 201 and their profile. The server 204 also knows that the user requested information while listening to a particular advertisement for a particular product. Furthermore, the server 204 knows about the audio source 208 and the programming that the user was hearing. In this regard, while server 204 establishes a communication with the commerce presence 916 (212), the server 204 can also forward certain information to the commerce presence 916 (212). Therefore, when a merchant or somebody at the call center associated with the commerce presence 916 (212) answers the phone, they can receive an email or a message some type of indication of who they are about to be connected. Therefore, rather than picking up the phone and not knowing who is calling, the merchant can have trained staff that can answer the phone and say something like "Hello, this is Michelle, thank you Mark for calling. We are excited that you heard our ad about the mountain bike while listening to ESPN radio, what would you like to know about the bike?" In this manner, the services provided by server 204 can shorten the business value chain such that the listener, Mark in this case, does not have to tell the merchant what they were doing, what product they were interested in and so forth. This can greatly focus the telephone experience between the customer and the merchant and increase the likelihood that the customer will desire to purchase the advertised product or even further products from the commerce presence 212. Therefore, by establishing a communication link between the server 204 and the commerce presence 212 in this manner, the user experience can be greatly enhanced.

In one aspect, to achieve the above ends, the server 204 communicates via the data communication network 206 to commerce presence 212 the information associated with a particular advertisement, the user, the user's profile, and so forth. Two separate channels may be identified, then the channel 204 between the server 202 and the commerce presence 212 which may be established by the server dialing a particular phone number to the commerce presence 212 and simultaneously emailing or communicating via the Internet information associated with that call. Then systems at the commerce presence 212 can link transmitted data and the currently received telephone call such that the person at the commerce presence that is receiving the call can have the advanced information about the end user.

In another aspect, the server 204 can connect via a telephone call with a commerce presence and provide a text to speech (or some other audio including pre-recorded audio) that tells the merchant "Mark wants to buy a bike, please stay on the line to be connected." The system then bridges the call. In this manner, the system 204 provides a simply approach to giving the merchant advanced notice of the caller's desire.

Ultimately, if an IVR system is used at commerce presence 212, then another aspect of the present disclosure involves the IVR system being able to be modifiable such that the prompts that are made can conform to the received information from server 204. For example, if server 204 sends information about the person's name being Mark, the product being a mountain bike, and the particular program being listened to is ESPN radio, then the IVR system may be modified in such a way as to bring the user to a particular point in the IVR call flow that bypasses introductory information. Therefore, rather than the IVR system answering the call by saying "Hi, this is merchant X, how may I help you?", the system may be able to answer the call by stating "Hi, this is commerce X, Mark how are you, you are interested in our mountain bikes, please let us help you . . . . " Therefore, in this aspect of the disclosure, a method involves the server 204 calling a commerce presence 212, and transmitting information associated with the user, user profile, the particular advertisement which prompted a user indication of a desire to purchase a product or service associated with the advertisement, and/or information about the current audio program in which the advertisement was played. The server transmits such information to the commerce presence 212 in a form in which an IVR system in commerce presence 212 may be modified based on that information. The commerce presence 212 then answers the telephone call from server 204, and interacts via the user via a modified IVR system. The server 204 will also buffer the streaming audio from audio source 208 until the conclusion of the telephone call with commerce presence 212 and if desired, simply continue to stream the audio from the audio source at the conclusion of the call with the commerce presence.

Another aspect of the disclosure involves enabling the user to manage their receipt of content. For example, assume a caller using a device 201 into server 204 is listening to streaming audio from audio source 208 but then has to take a break or make another phone call. In this embodiment, the user can provide an indication to the server to pause the stream on demand that they are currently listening to and request a call back or request the stream to be reconnected when the user calls back. This enables the caller to use the device 201 for another phone call or to take a break to do something else. The server 204 can buffer the content from the audio source 208 and hold it in preparation of continuing the audio stream when the user is prepared to continue. In one example, the user may indicate to server 204 to call them back in 30 minutes and continue playing the stream from the point at which they hung up. Server 204 can then buffer the stream, telephone the device 201 back and continue playing this stream from the previous point or even begin a few minutes before the point at which the user hung up to provide them with the context of the discussion at that point. The system can also buffer the audio until the user calls back and then pick up from that point. In this manner, the server 204 can manage the presentation of the streaming audio. In this context, there also may be a natural opportunity to provide an advertisement from the ad server 210. In this case, the server 204, prior to continuing playing the stream at the point where the user hung up, the system can insert an ad from the ad server 210 at that point and perhaps ignore a later advertisement. In this context, if the server 204 has 20 minutes of buffered audio from audio source 208 and 10 minutes into that buffered audio there is an advertisement indicator for 2 minutes of advertising, then the 2 minutes of advertising may be presented prior to the continuation of playing the audio stream such that the user hears the advertisement at the beginning, and then the remaining 20 minutes of streamed audio can be continuously streamed without an interruption. This increases the chances that the user will hear the advertisement as well as improves the listening experience of the user such that the remainder of the audio stream is heard without a break. Additionally, the system may then pick up following the first advertisement indicator and manage the rest of the advertisements throughout the audio stream in the normal fashion. The system may also make adjustments to selected advertisements based on this scenario. For example, if the user indicates that they would like to continue listening to the audio on the next day or for example in the evening, then the system may take that information and select different advertisements to play when the audio is resumed.

Figure 10:
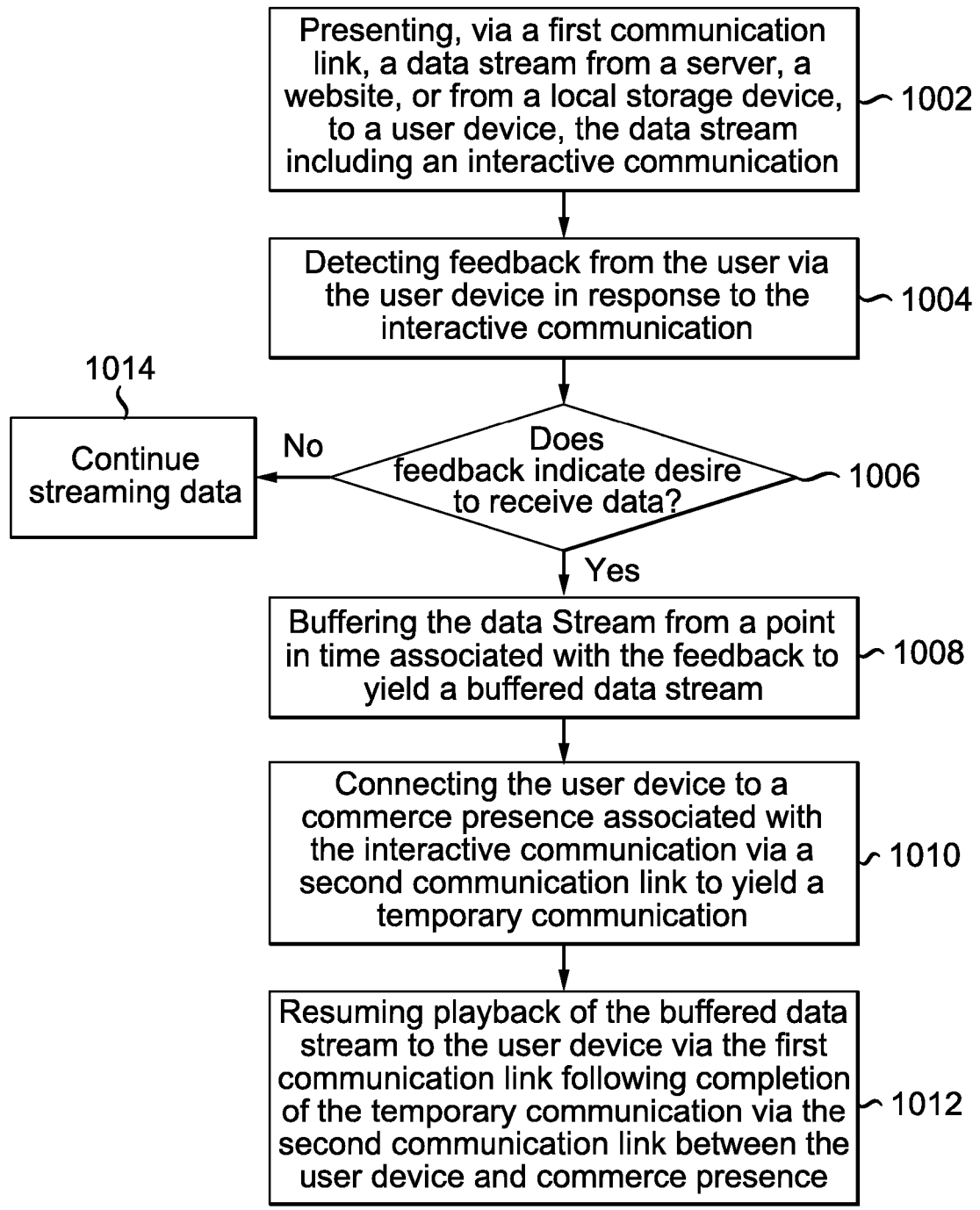
FIG. 10 is a flow diagram illustrating another embodiment for connecting a user with another person or commerce presence.

In another embodiment which is the focus of this continuation-in-part application, a method is shown in FIG. 10 and includes presenting, via a first communication link, a data stream from a server, a website, or from a local storage device, to a user device, the data stream including an interactive communication (1002). The data stream can be video, audio, still images, a combination thereof, or other forms of media such as an image or an image having accompanying audio. The data stream can come from the website or server or may be derived from a recording of the media locally on the device, with the addition of data from a server that enables the interactive communication. In other words, a home video taken on the device could be locally stored, and enhanced by data from a server such that when the user plays the recorded video, the ability to have an interactive communication is enabled. In this regard, the server could receive a notification that a media recording (still image, audio, video, etc.) has occurred locally (on a remote device such as a smartphone, tablet, or any device). The server could receive data about the media (time, place, location, face recognition information, context, user profile data of those in the image, etc.) and determine what kind of interactive communication could or should be available to the user when viewing the media from the local storage. The server can then communicate with the device to transmit data necessary to enable the user to have an opportunity for an interactive communication when the user view the media. For example, if the user takes a video of a friend sitting in a BMW at a dealer, the metadata about that video could include the friend's name identified via facial recognition, and the model of the car, and location. The dealer could contract to have the server, when the video is played on the device, to present the opportunity for the user to have a call with the customer service people associated with the dealer. This interactive capability would be enabled through data transmitted to the device and associated with that recorded media. Thus, the experience when viewing locally recorded media can be similar to the other experiences disclosed herein when receiving streaming data.

In another example, if you take a picture of a friend, and the face recognition result provides data to the server that the picture is of your friend John, then when you return back to the photo application and view the picture of John, the server could provide data to enable the viewer to have an interactive opportunity to call/chat with, text, email, skype or otherwise initiate some kind of communication with John. The interactive opportunity could be chosen based on John's availability, the context of the photo (it was taken in Mexico) independently or in connection with other data (John is back in Mexico now), and so forth. These kinds of interaction are made available by providing some data about recorded media on a device and then receiving further data which enables an interactive optional experience when the user views the locally recorded media.

The communication link can be any communication link such as a data link over the Internet to an application on a device. Any kind of data or voice communication link can be included within the scope of this disclosure. The method includes detecting feedback from the user via the user device in response to the interactive communication (1004) and, if the feedback indicates a request to receive data associated with the interactive communication (1006), performing operations including buffering the data stream from a point in time associated with the feedback to yield a buffered data stream (1008), connecting the user device to a commerce presence associated with the interactive communication via a second communication link to yield a temporary communication (1010) and resuming playback of the buffered data stream to the user device via the first communication link following completion of the temporary communication via the second communication link between the user device and commerce presence (1012). If the feedback indicates that the user does not want to receive data, then the data stream continues (1014).

Thus, a user can have an opportunity while receiving the data stream, of hearing other data, learning more, receiving more information and/or otherwise connect to a third part who at the time of the streaming of the data, is not part of the communication link. If the user responds to the interactive communication, then the data streaming is stopped, paused, and/or buffered such that a separate communication link to a third party can occur. Then, after the communication with the third party is over, then the data streaming resumes. Buffered data or live data can be connected. Either party or both parties in the communication link can be connected to one or more third parties. The commerce presence can be an individual or a person and does not have to necessarily be a business. The interactive communication can be a political message or communication, a public safety message, or an invitation to connect to other individuals or companies via social networking, and so forth. The other individuals may or may not be engaged in commerce but may just be others with interests that the user can connect with. A user profile that is used can include a telephone number or any other identifying data such as social networking data about the user.

Further, the third party communication does not have to be a voice communication. The user can provide feedback associated with the interactive communication and the result can be that the user receives a text on their smartphone, or data to an app, or a chat connection is opened up with an individual associated with a commerce presence, or a person in a social network, or just any individual. An application on a device can manage the data streaming as well as processing the interactive communication such that the user is able to provide input and be connected to a third party in the middle of the streaming data. Again, the connection can be audio, such as in a call, or video, or via a text, email or other communication. The communication with the third party can be live or discontinuous. For example, if the user desires to send an email, the data stream can be paused while the application brings up an email composition screen and allows the user to draft an email to the entity associated with the interactive communication. The email is sent off, and the data streaming continues. The user would expect an email in due course but not a real-time response. The user could also be placed into a social networking context. For example, they are listening to a radio program, and an interactive communication is provided where they can choose to go to facebook or twitter and tweet something or post something or "like" something. In this regard, the example scenario is an audio program where the radio host would urge people to "like" a facebook page, or receive a tweet or retweet a message, the interaction communication can be input into the data stream, the user's application can receive and process that input, such that the user, if listening, desires to take that action, they can say "yes" or provide some input, and then be placed in that context where they will be able to take the social networking action easily, and then return back to the data streaming program.

Embodiments within the scope of the present disclosure may also include tangible computer-readable storage media for carrying or having computer-executable instructions or data structures stored thereon. Such computer-readable storage media can be any available media that can be accessed by a general purpose or special purpose computer, including the functional design of any special purpose processor as discussed above. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

The invention claimed is:

1. A method comprising:
   detecting, via a processor, feedback in response to an interactive communication associated with a data stream on a first communication link; and
   if the feedback indicates a request to receive data associated with the interactive communication, performing steps comprising:
   buffering the data stream from a point in time associated with the feedback to yield a buffered data stream;
   connecting a device of a user to an entity associated with the interactive communication via a second communication link to yield a temporary communication; and
   resuming playback of the buffered data stream to the device via the first communication link following completion of the temporary communication via the second communication link between the device and the entity.

2. The method of claim 1, wherein the data stream comprises one of an audio stream, a video stream and a still image having streaming audio.

3. The method of claim 1, wherein the entity is one of a call center, a server, a person and an interactive voice response system.

4. The method of claim 1, wherein the interactive communication is an advertisement.

5. The method of claim 1, wherein one of the first communication link and the second communication link is a phone call.

6. The method of claim 1, further comprising superseding an advertisement in the first communication link in the data stream with a replacement advertisement selected from an advertisement database.

7. The method of claim 6, wherein superseding the advertisement further comprises detecting an advertisement identifier in the data stream and one of replacing, masking, inserting and augmenting the advertisement.

8. The method of claim 7, wherein the replacing of the advertisement further comprises replacing the advertisement with a new advertisement of equal duration.

9. The method of claim 7, wherein replacing the advertisement further comprises replacing the advertisement with a new advertisement of different duration.

10. The method of claim 1, further comprising transmitting information about content of the interactive communication to the entity prior to or while connecting the second communication link to a commerce presence.

11. The method of claim 1, wherein a user profile maintains user demographic information comprising at least one of age, race, gender, education level, health, economic status, geographic location, and religious affiliation and is used to select the interactive communication.

12. A system for streaming audio, the system comprising:
a processor; and
a computer-readable storage medium storing instructions which, when executed by the processor, cause the processor to perform operations comprising:
   detecting, via a processor, feedback in response to an interactive communication associated with a data stream on a first communication link; and
   if the feedback indicates a request to receive data associated with the interactive communication, performing steps comprising:
   buffering the data stream from a point in time associated with the feedback to yield a buffered data stream;
   connecting a device of a user to an entity associated with the interactive communication via a second communication link to yield a temporary communication; and
   resuming playback of the buffered data stream to the device via the first communication link following completion of the temporary communication via the second communication link between the device and the entity.

13. The system of claim 12, wherein the data stream comprises one of an audio stream, a video stream and a still image having streaming audio.

14. The system of claim 12, wherein the entity is one of a call center, a server, and an interactive voice response system.

15. The system of claim 12, wherein the computer-readable storage medium stores further instructions which, when executed by the processor, cause the processor to perform operations further comprising:
   transmitting user profile information to the entity.

16. A computer-readable storage device storing a set of program instructions which, when executed by a processor, cause the processor to perform operations comprising:
   detecting, via a processor, feedback in response to an interactive communication associated with a data stream on a first communication link; and
   if the feedback indicates a request to receive data associated with the interactive communication, performing steps comprising:
   buffering the data stream from a point in time associated with the feedback to yield a buffered data stream;
   connecting a device of a user to an entity associated with the interactive communication via a second communication link to yield a temporary communication; and
   resuming playback of the buffered data stream to the device via the first communication link following completion of the temporary communication via the second communication link between the device and the entity.

17. The computer-readable storage device of claim 16, wherein the data stream comprises one of an audio stream, a video stream and a still image having streaming audio.

18. The computer-readable storage device of claim 16, wherein the commerce presence is one of a call center, a server, and an interactive voice response system.

19. The computer-readable storage device of claim 16, wherein the computer-readable storage device stores a further set of program instructions which, when executed by a processor, cause the processor to perform operations further comprising transmitting user profile information to the commerce presence.

* * * * *